Inventor

Sueo Terao

By Clarence A O'Brien
Attorney

Nov. 5, 1929.  S. TERAO  1,734,059
EMERGENCY BRAKE
Filed June 11, 1927   3 Sheets-Sheet 2

Inventor
Sueo Terao

By Clarence A. O'Brien
Attorney

Nov. 5, 1929.  S. TERAO  1,734,059
EMERGENCY BRAKE
Filed June 11, 1927    3 Sheets-Sheet 3

Inventor
Sueo Terao
By Clarence A. O'Brien
Attorney

Patented Nov. 5, 1929

1,734,059

UNITED STATES PATENT OFFICE

SUEO TERAO, OF MITCHELL, NEBRASKA

EMERGENCY BRAKE

Application filed June 11, 1927. Serial No. 198,155.

The present invention relates to an emergency wheel brake structure for use upon automobiles, and it has reference to a structure of this character which is supplementary to the ordinary brake structure.

More specifically speaking, I propose to provide a supplementary brake structure associated with the rear wheels and capable of independent operation with respect to the ordinary brake construction.

Briefly described, there is a separate brake shoe for each rear wheel, this shoe being located between the fender and the tire and being mounted on a guide bracket. The shoe is normally maintained in an ineffective state by spring means, but is constructed to be moved into operative connection with the tire and subsequently brought into engagement with the traction surface of the tire by novel operating means. The operating means, which may be broadly referred to as a thrust device, includes a hand manipulated control lever located within convenient reach of the driver, together with a safety appliance associated with the front bumper and operable when it engages an obstruction.

The physical features of the various details as well as the particular manner in which these are linked together provide a complete and efficient structure, will become readily apparent from the following description and drawings.

Figure 1:
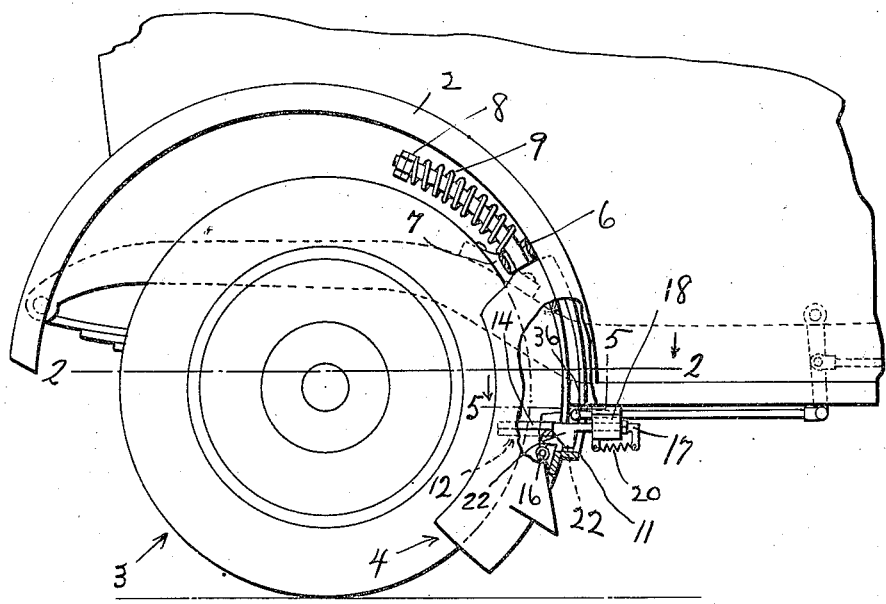
Figure 1 is a fragmentary side elevation showing a rear wheel and the part of the invention including the brake shoe which is held in suspended position to render it ineffective.
Figure 2:
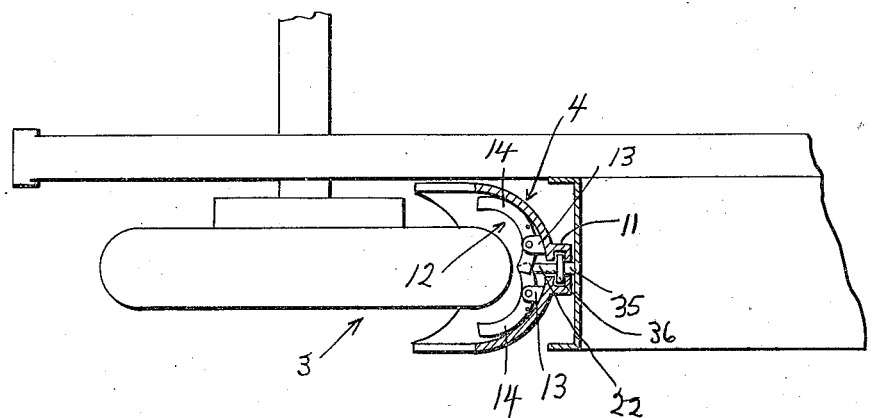
Figure 2 is a horizontal section taken approximately on the plane 2—2 of Figure 1.
Figure 3:
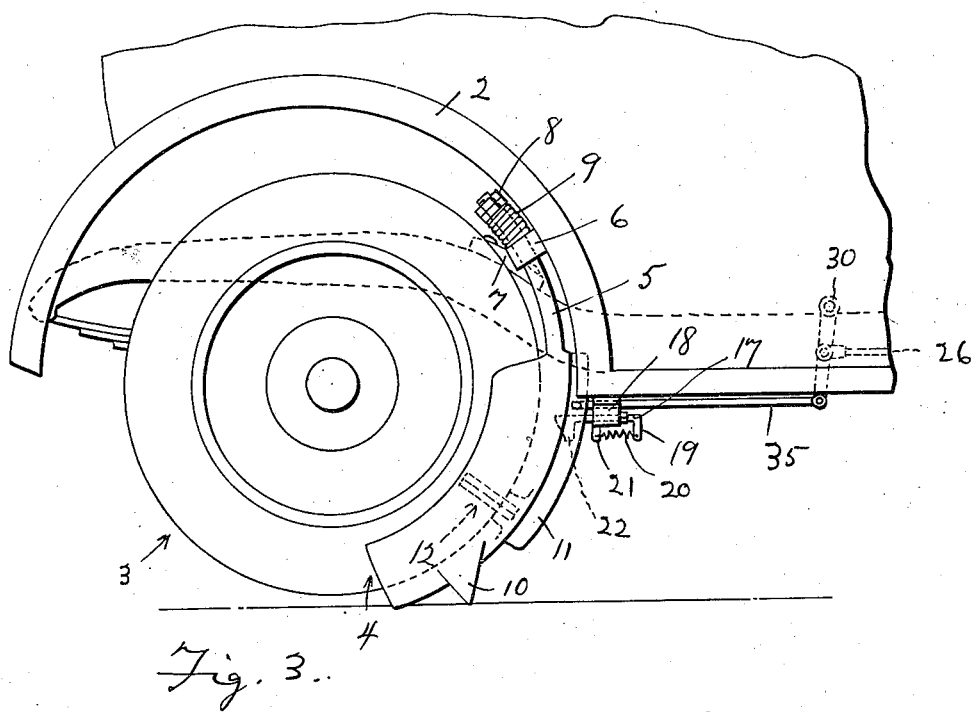
Figure 3 is a view similar to Figure 1 showing the brake shoe moved down into engagement with the road surface.

In the drawings shown in Figures 1 and 3, the reference character 1 designates the fragmentary portion of a part of an automobile body, 2 designates a rear fender, for the rear wheel 3. The wheel is of the usual rubber tired type. At this time I might state that I have shown a single side of the vehicle and a single braking device therefor. The structure is, however, duplicated on the opposite side, but a description of one will suffice for both. To this end, it will be noted that the reference character 4 designates what has been broadly termed a brake shoe. This comprises a channel shaped segmental shell of the configuration represented better in Figures 5 and 6. This shell is of arcuate form in its longitudinal dimensions and it is provided at its upper end with a longitudinally bowed connecting and guide shank 5. This shank extends upwardly through a guide ring 6 carried by a bracket 7 which is fastened on the adjacent frame bar of the automobile. The upper end is screw threaded and carries a retaining nut 8, and a coil spring 9 surrounds this portion of the shank between the nut and the guide. Incidentally, this spring is of the expansion type and it therefore serves normally to suspend or hold the shoe up and out of engagement with the ground and the surface of the tire. As before indicated the shoe is located between the under side of the fender and the surface of the tire. It will also be noted that adjacent the lower end, the shoe carries a ground engaging lug 10 while just above this is a pair of guide tracks 11 to serve a purpose to be hereinafter described. The cross sectional shape of these tracks is better shown in Figures 5 and 6.

Figure 5:
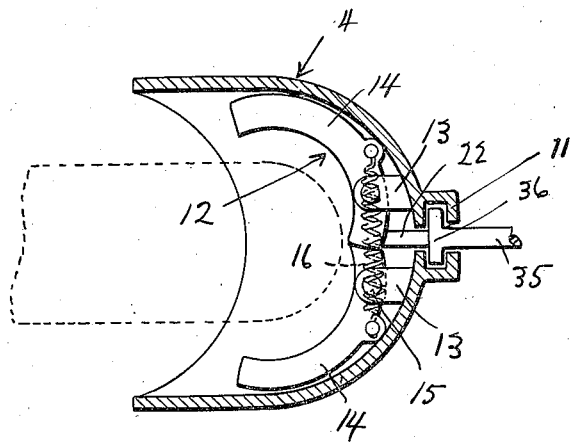
Figure 5 is an enlarged section taken approximately upon the plane of the line 5—5 of Figure 1 showing a special tire engaging and clamping device in its disengaged state.
Figure 6:
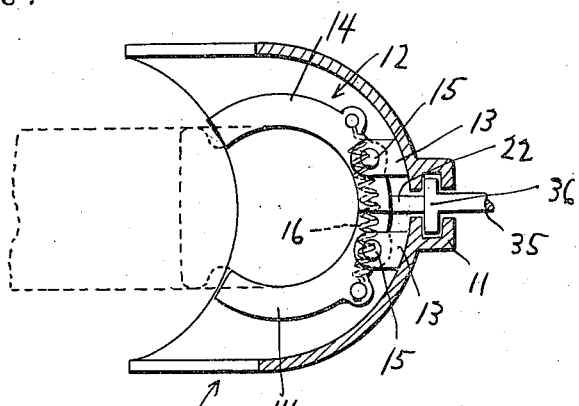
Figure 6 is a view like Figure 5 showing the same clamping device gripping the tire.
Figure 7:
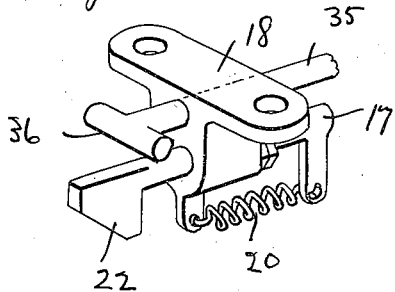

It will be well to consider now the clamping device 12 shown in Figures 5 and 6. As indicated here, the shoe is provided on opposite sides of the longitudinal slot with a pair of inwardly extending ears 13 upon which a pair of segmental gripping jaws 14 are pivotally mounted as at 15. These jaws are of a shape to embrace and grip the tire as represented better in Figure 6 and the inner pivoted end portions are disposed in overlapping relation. Moreover, a coiled spring 16 is connected at its opposite ends with these jaws outwardly of the pivotal connection and the purpose of this spring is to contract or cause these jaws to grip the tire when released. Normally, however, when the shoe is up and out of the way, the jaws are spread apart and held in this disengaged state by the spring 16 as shown in Figure 5. The means for doing this comprises a slide 17 which is slidably mounted in an appropriate suspension guide 18 on the underside of the running board as shown for instance in Figure 3. The forward end of this slide has a down-turned portion 19 with which a coil spring 20 is connected and this coil spring is anchored at its opposite end to a lug 21 on the other side of this guide. The slide 17 extends between the guide tracks 12 and in through the slot in the shoe and here it terminates in an enlarged head 22 which has bevelled surface forming a cam. Obviously then, after the shoe has been moved down to the position shown in Figure 3 and starts to move back to its original position, this cam nose comes into play. It will be remembered, however, that when the shoe is down, the clamping device 12 is encircling the tire and at this time the overlapped ends of the jaws assume the position shown in Figure 6, the same being held here through the action of the spring 16. However, as the shoe moves upwardly, the overlapped ends of these jaws come into engagement with the bevel or cam which serves to thrust these ends inwardly and to spread the jaws apart so that they assume the position shown in Figure 5. In order that this action will be gentle, the spring 20 is provided. It is to be observed in this connection that the coiled spring 16 is so anchored at its outer end, with respect to the pivotal mounting for the jaws 14, that the ends of the spring pass beyond "dead center" as seen in Fig. 5, thus holding the jaws 14 normally spread apart with the inner overlapped ends in a position to engage the tire tread for subsequent releasing when these ends are thrust against said tread.

Figure 4:
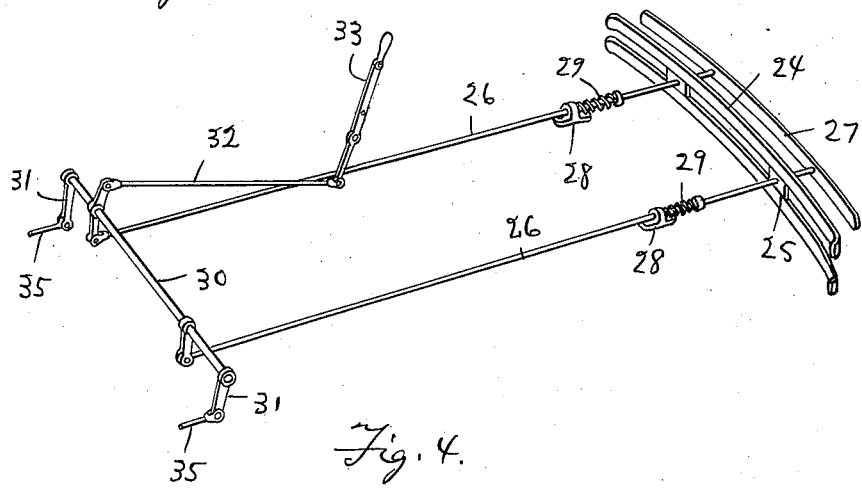
Figure 4 is a perspective view showing the safety appliance and the hand operated control lever together with a part of the thrust device.

Attention is now invited to the particular construction of the so-called thrust device. In the first place it would be advisable to consider Figure 4 wherein an important part of this is shown. As represented here, the reference character 24 designates a bumper provided with a pair of guide blocks 25. The bumper may be of any suitable construction. Extending through and beyond these guide blocks we find a pair of spaced parallel operating shafts 26 which connect at their forward ends to a cross member 27. In connection with this part 27 it is to be pointed out that its office is to engage an obstruction in advance of the bumper to operate the shafts 26. For instance, it is a safety appliance, and if the operator runs into a person, a post, or other obstruction, this safety member 27 will be pushed rearwardly and push the shafts 26 in a corresponding direction. These shafts extend through guide brackets 28 and are surrounded by coil springs 29 which are constructed to normally maintain the safety member 27 in an extended position as shown in this figure. The shafts 26 connect with a rock shaft 30 provided at opposite ends with rocker arm 31. Also, a link 32 connects with this same shaft and the link in turn is connected with a hand operated control lever 33. A pair of push rods 35 connect with the rocker arms 31 and extend rearwardly therefrom through the aforesaid guides 18. Each push rod 35 terminates in a T head 36 which is located in the guide tracks 11. (See Figs. 5 and 6). This arrangement permits the desired sliding movement of the brake shoe, but allows the push rod to bring the brake shoe into operating position. With this arrangement it will be seen that the brake shoes can be operated either through the medium of the hand manipulated lever 33 or by way of the safety device 27 either of which operates the push rod 35 for exerting a rearward stress upon these to bring the brake shoes into play.

The operation of the invention is as follows:—It is first to be remembered that the brake shoe is held in ineffective suspended position by the expansion spring, as shown in Fig. 1. At this time, the brake shoe is spaced away from the tread of the rotating tire and does not interfere with the travel. Also, at this time, the clamping jaws 14 assume the position seen in Fig. 5. As before explained, the coiled spring 16 having its outer end anchored at points disposed and beyond dead center, the jaws are held in this position with the inner overlapped ends in readiness to momentarily strike against the tread of the tire for releasing the springs and the dogs.

Assuming now that the thrust device is brought into play, either by the safety appliance, or thru the medium of the hand lever, the thrust rod 35 exerts a rearward pressure against the brake shoe. When the brake shoe is thrust toward the rotating tire, with the clamping jaws 14 in the position seen in Fig. 5, it is obvious that the overlapped inner end portions of these jaws will momentarily strike the tread of the tire, thus releasing the spring 16 and permitting it to swing the two jaws upon their pivots, causing them to embrace the rotating tire as shown in Fig. 6.

Obviously, with the jaws thus gripped about the tire, the brake shoe will be temporarily clamped to and will be moved down to the braking position seen in Fig. 3.

As before stated when the shoe moves back to its original position, the cam means comes into play, for instance, the overlapped pivoted ends of the jaws 14 comes into engagement with the cam which spreads the jaws apart, after which they are retained in this position by the tension of the spring 16.

Hence the spring serves to hold the jaws spread apart and also serves to swing them upon their pivots to gripping positions when released.

It is thought that by considering the description in connection with the drawings a clear understanding of the construction and operation and merits of the invention will be had. Therefore, a more lengthy description is thought unnecessary.

Minor changes in shape, size and rearrangement coming within the scope of the claims may be resorted to if desired.

Having thus described my invention, what I claim as new is:—

1. In a structure of the class described, a brake shoe comprising a shell of channel shaped cross section and of longitudinally bowed shape, a lug carried by said shoe and adapted to engage a traction surface, a shank carried by said shoe, said shank being bowed longtudinally, an attaching bracket provided with a guide through and beyond which said shank extends, and spring means associated with said guide and the end of said shank.

2. In a structure of the class described, a longitudinally bowed brake shoe of channel shaped cross section adapted for cooperation with the traction surface of a tire, a lug carried by said shoe, spaced parallel guide tracks also carried by said shoe, a longitudinally bowed shank connected with said shoe, an attaching bracket provided with a guide through and beyond which said shank extends, a nut on the end of said shank, a spring surrounding said shank between said nut and said guide, clamping means carried by the interior of the shoe, a cam actuating device for said clamping means, and a push rod having a head slidably mounted in said guide tracks.

In testimony whereof I affix my signature.

SUEO TERAO.